UNITED STATES PATENT OFFICE 2,395,307

PREPARATION OF ORGANIC SALTS

Arthur G. Weber and Clement H. Hamblet, Wilmington, Del., assignors to E. I. du Pont de Nemours & Company, Wilmington, Del., a corporation of Delaware No Drawing. Application October 6, 1943, Serial No. 505,214

5 Claims. (Cl. 260—414)

This invention relates to a process for the preparation of metallic salts of organic acids and more particularly to the preparation of metal soaps of the fatty acids.

Various methods have been proposed for the preparation of the metallic salts of the organic acids such, for example, as the reaction of the organic acid with a heavy metal carbonate or by the exposure of the metal to the warm vapors of the organic acids, the latter procedure being employed for the preparation of white lead, requiring many days and in some cases weeks in processing. These slow and tedious processes are unsuitable for rapid economical formation of the heavy metal salts of organic acids.

An object of the present invention is to provide a process for the preparation of metal salts of organic acids. Another object of the invention is to provide a process wherein organic acids can be converted to the corresponding metal salt by direct contact with a metal. A further object of the invention is to provide a process wherein the organic acid and more particularly the fatty acids are converted to lead salts by direct reaction with lead in the presence of oxygen. Other objects and advantages of the invention will hereinafter appear.

The above objects are accomplished in accord with the broadest aspects of the invention by a process wherein an organic acid is heated with a heavy metal while in contact with oxygen. More specifically, the process may be conducted by passing an oxygen-containing gas such as air and the organic acid into a converter charged with metal pellets, gas and acid flowing cocurrent or countercurrent through the converter.

The temperature of the reaction may vary through wide limits according to the nature of the organic acid used and the heavy metal with which it is to react, the unsaturated acids being preferably reacted at a lower temperature than the saturated acids to inhibit degradation. When normally solid acids are treated they should be heated at least to that temperature at which they are fluid in order that the oxygen or oxygen containing gas can be easily bubbled through them. Generally speaking, however, temperatures may range between 50 and 200° C. and more specifically for the fatty acids, temperatures ranging between 70 and 150° C. with a preferred range for the preparation of the lead soaps of such acids between 100 and 120° C. Atmospheric or superatmospheric pressures may be used if desired.

The process of the invention is adapted to the preparation of heavy metal salts from any organic acid or mixture thereof. As examples of the organic acids that may be employed in accord with the process of the invention are: the fatty acids; acetic, propionic, butyric, caproic, lauric, palmitic, stearic, ricinoleic, melissic, and other members of the fatty acid series as well as the acids derived from coconut oil, corn oil, cottonseed oil, rapeseed oil and similar vegetable oils; hydroxy acids such, for example, as glycolic acid, lactic acid, and tartaric acid; as well as polycarboxylic acids such, for example, as oxalic acid, glutaric acid and adipic acid; and the unsaturated acids such for example as acrylic acid, and methacrylic acid, as well as the aromatic acids such, for example, as benzoic acid and naphthenic acid.

The heavy metals that may be used include such metals as copper, cadmium, zinc, iron, nickel, silver, tin and especially lead although other salt forming metals may be reacted with the above compounds for the preparation of the corresponding acid salts.

The process may be carried out by a continuous or discontinuous procedure. The former may, for example, be illustrated by the use of a converter of considerably greater length than cross section disposed in a vertical position and charged with pellets of a metal which may be in the form of chips, flakes, or metal pellets of a suitable diameter such as, for example, from ⅛ to ½ inch. The organic acid to be converted to the metal salt is introduced into the converter together with an oxygen containing gas such as air and the reaction within the converter maintained at the optimum temperature for the particular type of acid being converted. When carried out in this, the preferred manner, the acid may be introduced at the top of the converter and the product collected from the bottom while air is permitted to bubble up through the descending acid and the process thereby conducted under countercurrent flow conditions, the spent air being allowed to issue from the top of the converter carrying with it the water formed during the reaction. Contrarywise, both acid and air can be introduced into the bottom of the converter to give cocurrent flow, the product as well as the spent air and water formed issuing from the top of the converter. To enhance the flow of fluids within the converter, which increases the speed of the reaction, a portion of the reactants may be pumped from the top of the converter and reintroduced into the bottom thereof, the velocity and turbulence of the flow within the converter being regulated in part by the amount and degree of this recycled material. As will be appreciated by those skilled in the art, the recycling may be conducted in the reverse order that is by taking the product from the bottom and reintroducing it into the top of the converter, although the reverse is the preferred method, and a further modification may be effected by removing the product from intermediate positions and returning it through intermediate positions to the converter. If desired, the throughput of acid may be adjusted to the length of the converter in order that substantially all of the acid is converted to its salt as it emerges from the converter.

The process may likewise be conducted batchwise which may be effected by charging a converter such as that described above or any suitable vessel with the metal particles and the acid to be reacted, the acid is raised to reaction temperature and the reaction continued until all of the acid has been converted to the salt whereupon it is discharged from the converter. Throughout the reaction air or oxygen or an oxygen containing gas is bubbled through or otherwise dispersed into the liquid. During batchwise processing it is likewise desirable to recirculate the reactants which may be accomplished by an outside circuit provided with a suitable pump whereby the reactants are removed and returned to the vessel in order to maintain a constant, preferably turbulent, flow within the vessel.

When a converter of greater length than cross section is employed, which prior to operation is charged with the metal pellets and the organic acid, the reaction starts with a homogeneous liquid mixture throughout the converter. If, however, a relatively water-insoluble acid is used or a salt which is relatively water insoluble is formed the homogeneous conditions initially present in the converter soon disappear. This is caused by the formation of water resulting from the preparation of the salt. Since the acid is generally lighter than the water, the latter tends to collect in the bottom of the converter during the initial stages of the reaction. As the reaction proceeds and the metal salt increases in concentration in the converter the positions of water and acid and product in the converter are reversed. Unfortunately, this reversal in position takes place rapidly with a vaporization of an appreciable part of the water with the result that unless due precautions are taken a large part of the charge will be blown from the top of the converter.

It has been found that the above disadvantageous result can be eliminated by recycling some of the material from the converter through an external separator. This method inhibits the settling of large amounts of water during the initial stages of the reaction and thereby renders it possible to conduct the reaction without loss of products from this cause.

The reaction of an organic acid with a metal is exothermic and consequently after the reaction has been initiated no further heat input is required but on the contrary means must be provided to withdraw the heat of reaction in order to maintain the temperature within proper bounds. Some of the heat of the reaction is absorbed by the water discharged with the spent gas from the converter, another portion by the sensible heat in the spent gases but it has been found that in addition to these heat controlling means it is often desirable to introduce water into the converter and utilize its sensible and latent heat to control the reaction within the preferred temperature range.

As has been indicated the process is applicable to the conversion of any organic acid to its metal salt. Inasmuch as some metal salts are soluble in a liquid consisting of the acid portion of the salt while others are not, a different procedure is recommended when metal salts of different types are to be made. When the metal salt is soluble in the acid of which it is made it is merely necessary to maintain the temperature of the reaction above the transition point of the mixture if a batchwise or continuous process is to be conducted. In some cases, the solution of acid and salt can be withdrawn from the converter, cooled down to precipitate the salt, the salt separated by filtration and the acid returned to the converter. Analogous to the latter type of procedure is that used for the preparation of salts which are relatively insoluble in the acid. Under such circumstances it is usually desirable to effect the reaction in a mutual solvent for the acid and salt from which the salt can be crystallized or otherwise separated after withdrawing it from the reaction converter, the unreacted acid being returned to the reaction.

The use of a solvent may be illustrated by the preparation of zinc propionate wherein an aqueous solution containing 80% propionic acid or less together with air is passed through a converter containing zinc, the product issuing from the converter is passed into a cooling and crystallizing chamber, the crystals of zinc propionate separated and the aqueous solution of propionic acid returned to the converter with make-up acid preferably after removal of water of reaction.

The examples which follow illustrate embodiments of the invention in which parts are by weight and to which the invention is not to be limited:

*Example 1.*—A stainless steel tower with an internal diameter of 3⅞" and a height of 10' was completely filled with lead fragments, obtained by passing molten lead through a $\frac{1}{16}$" tube into water, except for a 4" space at the bottom which was packed with ¼" glass pellets supported on a perforated cone. The tower was charged with 14,000 g. of coconut oil acids and air was passed into the bottom of the tower while spent air, water vapor, the unconverted organic reactant and lead salts passed out of the top of the tower into a separator from which the spent air and water as vapor were discharged to the atmosphere. The unconverted organic acid together with the salt thereof was returned to the bottom of the tower. A valve was provided in the bottom of the recirculating line through which the lead soap formed was discharged after the desired conversion had been reached.

Air was introduced into the tower at a space velocity of 95 and the reaction mixture heated to a temperature of approximately 115° C. At the end of 3 to 4 hours the apparatus was fully discharged and a product obtained which had an analysis corresponding to 85% conversion of the original acid to lead soap.

*Example 2.*—The apparatus of Example 1 was charged with lead fragments obtained by passing molten lead through a 3/16" I. D. tube into water. 14,000 g. of coconut oil fatty acids containing 1.4 g. of hydroquinone were introduced and the reaction conducted at 115° C. with recirculation. In order to determine advantages derived from a variation of the air rate, the conditions were adjusted as follows:

Air rate, cu. ft. per hour _____ 39.4  53.3  80.8
Time in hours required to obtain
  85% conversion _____ 4.0   3.6   3.0

No detectable amounts of carbon dioxide were evolved during the reaction.

*Example 3.*—The apparatus described in Example 1 was charged with ⅛" lead spheres, and used for the conversion of coconut oil fatty acids to lead salts thereof with and without recirculation. In each instance 0.1% hydroquinone based on acid was used. The conditions employed were:

|  | No recirculation | Recirculation |
|---|---|---|
| Weight of acid charged, grams | 4,000 | 11,000 |
| Temperature, °C | 115 | 113 |
| Air rate, cu. ft. per hour | 12 | 11.1 |
| Production rate, lbs. per cu. ft. per hour | 2.81 | 4.53 |

The product obtained in both instances showed a 90% conversion. This example illustrates the advantage of using a circulating system, in addition to the advantages described in the specification. It makes possible a larger throughput for a given apparatus. In operation without recirculation, a large dead space had to be provided in the tower to take care of foaming when the water rose as a result of increase in charged density.

*Example 4.*—The apparatus described in Example 1 was charged with ⅛ lead spheres and coconut oil acids continuously introduced at the top of the tower at the rate of 680 g. per hour. The temperature within the tower was maintained between 99 and 105° C. and air introduced at the bottom of the tower at a rate of 10 cu. ft. per hour. The rate of flow was such that the product issuing from the bottom of the tower upon analysis showed an 80% conversion of the coconut oil fatty acids to lead soaps thereof. The soap was produced in accord with this process at a rate of 2.70 lbs. per cubic foot of tower volume per hour.

*Example 5.*—A reaction vessel having a ratio of length to cross section of approximately 10:1 was charged with lead particles obtained by pouring molten lead through a 0.3 centimeter screen into cold water. The tower was then filled with 320 parts of oleic acid and the reaction conducted at approximately 80° C. while 15 parts by volume of air per hour was bubbled through the acid. At the end of 4.2 hours the product was discharged and found to have a dissolved lead oleate content corresponding to 55% conversion of the acid to salt. During the reaction carbon dioxide was evolved from the top of the tower to such an extent that it indicated a degradation of 0.6% of the acid charged. The degradation increased at a faster rate than the conversion.

*Example 6.*—The apparatus described in Example 5 was charged with lead pellets and 336 parts of oleic acid and the reaction conducted therein at a temperature of 50 to 65° C. while there was passed through the acid approximately 11 parts per hour of air. At the end of 7.1 hours the product was discharged and found to have a dissolved lead oleate content corresponding to 52% conversion of the acid to the salt. Substantially no carbon dioxide evolution was detected during the process of this example and this finding is ascribed to the decrease in operating temperature. It will be noted, however, that this decrease in decomposition was accomplished only with a sacrifice in production rate and in higher viscosity of the acid and its salt under the temperature conditions of the reaction. The flow of the reactants through the converter became progressively more difficult.

*Example 7.*—The apparatus of Example 5 was charged with 361 parts of oleic acid containing 0.4 part of hydroquinone. The reaction was conducted at a temperature between 70 and 100° C. and with an air rate of approximately 15 parts per hour. At the end of four hours the product was discharged and found to contain lead oleate corresponding in amount to a 65% conversion of the acid to salt. During this reaction no carbon dioxide evolution was detected even with temperatures in the neighborhood of 100° C.

*Example 8.*—The apparatus of Example 5 was charged with commercial mossy zinc and charged with approximately 350 parts of a 75% solution of propionic acid in water. The reaction was carried out under two sets of conditions, one using nitrogen, the other oxygen as the gas passed through the apparatus. The results obtained by these processes were:

|  | Processing gas | |
|---|---|---|
|  | Nitrogen | Oxygen |
| Temperature, °C | 129–130 | 129–130 |
| Off-gas, space velocity per hour | 8.8 | 11.4 |
| Duration, minutes | 70 | 55 |
| Production, lbs. per cu. ft. of reaction space per hour | 3.5 | 11.3 |

The average product rate was approximately 3.3 times as great in the presence of oxygen as in the presence of nitrogen. The product issuing from the reaction in both cases was cooled to crystallize the propionic acid and the unconverted aqueous propionic acid returned to the converter.

As shown by the examples, the rate of oxygen flow may be varied and it has been found that this variation may range between a space velocity of 10 and 100, space velocity being defined as the unit volume of air passing per hour per superficial volume occupied by the metal particles in the tower, the fluid volumes being determined under standard temperature and pressure conditions. While the examples have described the use of air, other inert gas-oxygen mixtures may be employed or for that matter pure oxygen may be used.

As illustrated by the examples, the use of an antioxidant is highly advantageous when unsaturated organic acids are converted to their salts. The evolution of carbon dioxide indicates degradation of the acid or salt during the reaction and it has been found that the presence of an antioxidant inhibits and usually entirely eliminates this degradation. Suitable examples of antioxidants which may be employed are in addition to the hydroquinone described in the examples pyrogallol, phenol, phenyl-alpha-naphthyl amine, mesitols, and other suitable antioxidants. The antioxidant may be used in amounts ranging between 0.005 and 2% of the organic acid by weight with a preferred range particularly for hydroquinone between 0.01 and 0.02.

We claim:
1. In a process for the preparation of heavy metal soaps of the fatty acids, the steps which comprise passing a fatty acid and air into a re- action zone charged with the heavy metal selected from the group consisting of lead, copper, cadmium, zinc, iron, nickel, silver, and tin, conducting the reaction therein at a temperature between 50 and 200° C., withdrawing the heavy metal salts of the acid and the unreacted acid from the reaction zone after they have passed through it, and reintroducing them into the reaction zone the recirculation being sufficient to inhibit settling within the reaction zone.

2. In a process for the preparation of lead soaps of the fatty acids, the steps which comprise passing a fatty acid, an antioxidant and air cocurrent and upwardly into a reaction zone charged with lead particles, and maintained at a temperature between 100 and 120° C., withdrawing the lead soaps formed and the unreacted acid, reintroducing them into the reaction zone and continuing the recycling until the concentration of the lead soap has increased to a satisfactory amount the recirculation being sufficient to inhibit settling within the reaction zone.

3. In a process for the preparation of lead soaps of coconut oil acids, the steps which comprise introducing coconut oil acids, an antioxidant and air into a reaction zone charged with lead particles, maintaining the temperature therein at between 100 and 120° C., withdrawing the lead soaps of the coconut oil acids and the unreacted coconut oil acids from the reaction zone after they have passed through it, reintroducing them into the reaction zone and continuing the recycling until the lead soaps of the coconut oil acids has increased to a satisfactory amount the recirculation being sufficient to inhibit settling within the reaction zone.

4. In a process for the preparation of lead soaps of oleic acid, the steps which comprise introducing oleic acid, hydroquinone and air into a reaction zone charged with lead particles, maintaining the temperature therein at between 100 and 120° C., withdrawing the lead soaps of the oleic acid and the unreacted oleic acid from the reaction zone after they have passed through it, reintroducing them into the reaction zone and continuing the recycling until the lead soaps of the oleic acid has increased to a satisfactory amount the recirculation being sufficient to inhibit settling within the reaction zone.

5. In a process for the preparation of lead soaps of coconut oil acids, the steps which comprise introducing coconut oil acids, hydroquinone and air into a reaction zone charged with lead particles, maintaining the temperature therein at between 100 and 120° C., withdrawing the lead soaps of the coconut oil acids and the unreacted coconut oil acids from the reaction zone after they have passed through it, reintroducing them into the reaction zone and continuing the recycling until the lead soaps of the coconut oil acids has increased to a satisfactory amount the recirculation being sufficient to maintain turbulence of flow within the reaction zone such that settling is prevented.

ARTHUR G. WEBER.
CLEMENT H. HAMBLET.